United States Patent
Alves et al.

(10) Patent No.: US 10,598,523 B2
(45) Date of Patent: Mar. 24, 2020

(54) SENSOR CARRIER IN A MOTOR VEHICLE

(71) Applicant: FORD GLOBAL TECHNOLOGIES, LLC, Dearborn, MI (US)

(72) Inventors: Bruno Alves, Hueth (DE); Sebastian Stauff, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 16/007,456

(22) Filed: Jun. 13, 2018

(65) Prior Publication Data

US 2018/0364077 A1 Dec. 20, 2018

(30) Foreign Application Priority Data

Jun. 14, 2017 (DE) .................. 10 2017 210 038

(51) Int. Cl.
*G01D 11/30* (2006.01)
*B60K 31/00* (2006.01)
(Continued)

(52) U.S. Cl.
CPC .............. *G01D 11/30* (2013.01); *B60K 11/08* (2013.01); *B60K 31/00* (2013.01); *G01D 11/10* (2013.01)

(58) Field of Classification Search
CPC ................................ G01D 11/30; G01D 11/10
See application file for complete search history.

(56) References Cited

U.S. PATENT DOCUMENTS 5,326,133 A * 7/1994 Breed .................. B60R 19/483
180/274
5,757,157 A * 5/1998 Falk ...................... B64D 47/08
244/115
(Continued)

FOREIGN PATENT DOCUMENTS

DE 102005037151 A1 2/2007
DE 102008015404 A1 10/2008
(Continued)

OTHER PUBLICATIONS

"International Conference on Vehicle and Mechanical Engineering and Information Technology, 2014" dated Feb. 19, 2014-Feb. 20, 2014 by Trans Tech Publications, Ltd.
(Continued)

*Primary Examiner* — Jamel E Williams
(74) *Attorney, Agent, or Firm* — Frank Lollo; Brooks Kushman, P.C.

(57) ABSTRACT

The disclosure relates to a sensor carrier as a mechanical connection of a sensor to a component of a motor vehicle. The sensor carrier has a sensor section to fix the sensor to the sensor carrier, at least one component section to fix the sensor carrier to the component, and at least one intermediate section that connects the sensor section to the at least one component section. The sensor carrier is composed, at least in the intermediate section, of an inherently rigid cellular material, the cavities of cellular material are arranged regularly, at least in some sections, specifically in such a way that, starting from a defined minimum force, the material of the sensor carrier in the intermediate section is intrinsically more deformable in at least one direction than in other directions.

20 Claims, 1 Drawing Sheet

(51) Int. Cl.
  *B60K 11/08* (2006.01)
  *G01D 11/10* (2006.01)

(56) References Cited

U.S. PATENT DOCUMENTS

| | | |
|---|---|---|
| 6,085,598 A | 7/2000 | Baba et al. |
| 2007/0063133 A1 | 3/2007 | Furuya |
| 2014/0262555 A1 | 9/2014 | Johnson |

FOREIGN PATENT DOCUMENTS

| | | |
|---|---|---|
| DE | 102007045001 A1 | 4/2009 |
| DE | 102012204267 A1 | 9/2013 |
| DE | 102015009474 A1 | 1/2016 |
| DE | 102016007386 A1 | 12/2016 |
| DE | 102016010441 A1 | 2/2017 |
| DE | 202017100165 U1 | 3/2017 |
| FR | 3014404 A1 | 6/2015 |
| JP | 200313305 A | 11/2000 |
| JP | 2007030535 A | 2/2007 |
| JP | 2015063196 A | 4/2015 |
| KR | 20060071513 A | 6/2006 |
| KR | 20100123755 A | 11/2010 |
| WO | 2016193635 A1 | 12/2016 |

OTHER PUBLICATIONS

"Cutomise Your Bike Mount With 3D Printed Collars," dated Apr. 2, 2013, published by 3ders.org, pp. 1-10.
Travis Hoium, "3D Printing Opens a New World of Options for Automakers," for fool.com, dated Mar. 7, 2017, pp. 1-4.
Christopher Kirsch, et. al., "3D Printing is Already a Reality in Many Industries," dated May 19, 2014, pp. 1-3.
"Cars from the 3D Printers," 3D—Grenzenlos Magazin, World of 3D printing https://www.3-d-grenzenlos.de/magazin/them/autos-3d-drucker/.
Jim Kor, "The Car From the Printer—Vision and Reality," http://www.bayern-innovativ.de/ib/site/documents/media44923099-2f76-6af9-e-78b-5c1652d004e4.pdf/Auto_aus_dem_Drucker.pdf, pp. 4 & 5.

* cited by examiner

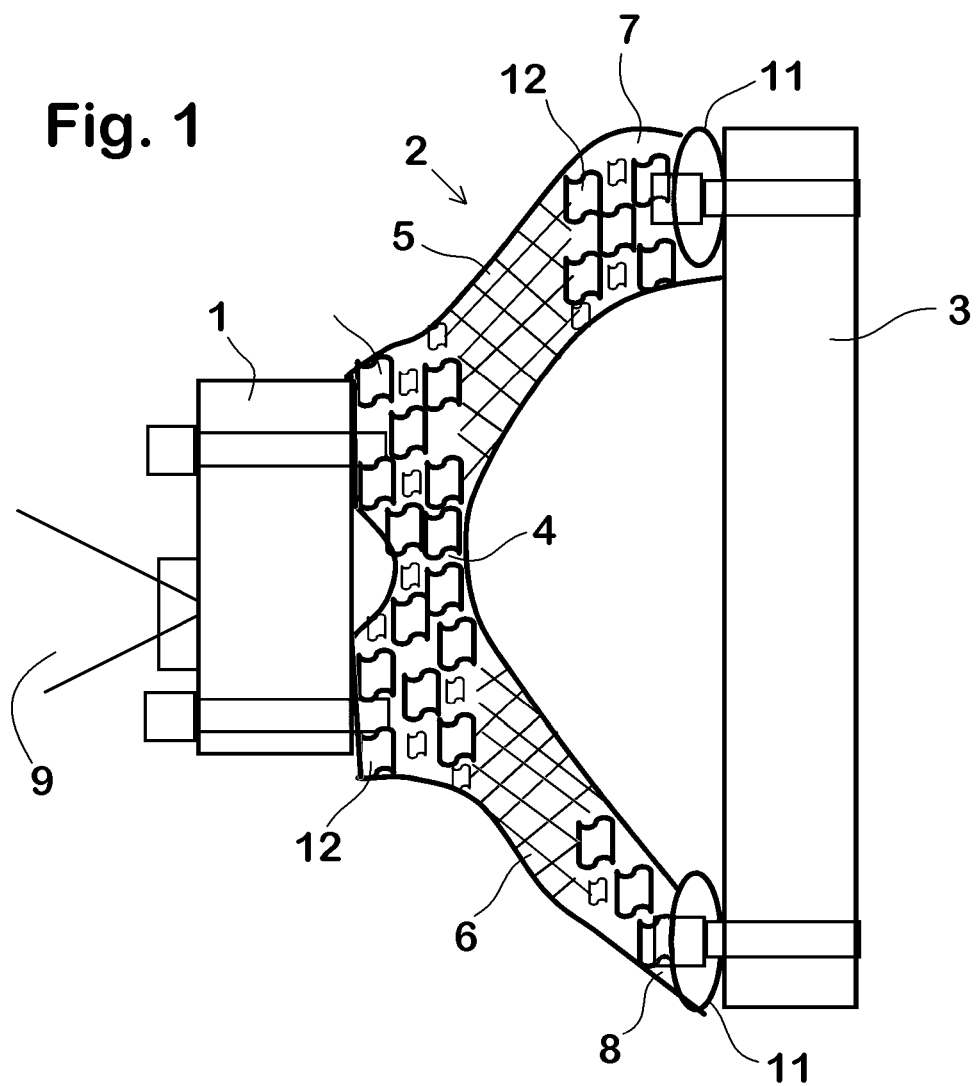
Fig. 1
Fig. 2
a) 
b) 
c) 

SENSOR CARRIER IN A MOTOR VEHICLE

CROSS-REFERENCE TO RELATED APPLICATIONS

This application claims foreign priority benefits under 35 U.S.C. § 119(a)-(d) to DE Application 10 2017 210 038.9 filed Jun. 14, 2017, which is hereby incorporated by reference in its entirety.

TECHNICAL FIELD

The disclosure relates to a sensor carrier as a mechanical connection of a sensor to a motor vehicle component.

BACKGROUND

A sensor carrier from U.S. Pat. No. 6,085,598 is used to fix a gas tank pressure sensor. In order that no leak can arise in an event of an accident, an intended breaking point is located between the sensor carrier and the sensor.

U.S. Pat. No. 5,326,133 discloses an impact sensor and carrier arrangement in front of a motor vehicle radiator. The carrier, consisting of a simple piece of sheet metal, has a deformable intermediate section, which deforms in a predictable controlled way in the event of an impact.

In addition, in other sensors in motor vehicles, in particular those sensors that are arranged so as to be rather exposed, a problem can exist that, in an event of an impact in which the sensor is affected, not only the sensor itself, but also a component that the sensor is fixed will be damaged, which entails more complicated repairs. It is also possible that a sensor mounted fixedly on the vehicle will injure pedestrians in an impact.

One example is a cruise-control sensor, i.e. a sensor for a speed control system, which is expediently fixed and held in position in front of the lower part of a radiator by a sensor carrier. Even in the event of a small impact or if pressure is inadvertently exerted on the sensor, the sensor carrier can destroy a sensitive radiator or attached parts of the same, such as, for example, an active radiator shutter, which controls the airflow through the radiator as necessary. A consequence is disproportionately high repair costs, since not only must the radiator and/or attached parts be replaced, but additional mounting work arises, for example to remove and refit a bumper. Of course, this applies not only to a cruise-control sensor, but in a similar way to all types of sensors that are preferably used in a front end region of the vehicle, such as an external temperature sensor, a LIDAR sensor or other sensors.

SUMMARY

The disclosure is based on an object to specify a sensor carrier that can likewise give way in an event of an impact, but is substantially more advantageous than a sensor carrier having a simple intended breaking point.

According to the disclosure, the sensor carrier is composed, at least in an at least one intermediate section, of an inherently rigid cellular material, cavities of the cellular material are arranged regularly, at least in some sections, specifically in such a way that, starting from a defined minimum force, a material of the sensor carrier in the at least one intermediate section is intrinsically more deformable in at least one direction than in at least one or any other direction.

A sensor carrier according to the disclosure is able to absorb shock energy and, as a result, to protect not only a sensor, but also a motor vehicle component that the sensor is fixed, and possibly also pedestrians, in an event of an impact. Furthermore, such a sensor carrier has good inherent rigidity for a well-defined position and angular position of the sensor, and the sensor carrier additionally has freedom from vibration and a low inherent weight. And, since such a sensor carrier does not normally break after an impact, but only crumples partially, the sensor does not hang loosely after an impact and remains seated stably on the sensor carrier and the motor vehicle component, and the component will in many cases remain serviceable.

Here, an inherently rigid, but intrinsically deformable, cellular material is understood to be a material that deforms noticeably only starting from a defined minimum force, and specifically inelastically; with a change in a cellular structure of the material, in particular sizes and positions of the cavities relative to one another, wherein individual walls of the cavities can give way or break, but without the sensor carrier breaking as a whole. Thus, such a deformation can also be designated as a "crushing", "crumpling" or "compression" of the cellular sensor carrier material.

A directional dependence of deformability of the sensor carrier material in the at least one intermediate section arises in particular from that any kind of volume element of equal size in all three spatial directions, e.g. in a form of a cube, is inelastically deformable in at least one direction with less expenditure of force than in at least one other direction. The expenditure of force can, for example, be half as great, but a force ratio can also be much greater than a factor of two, so that the sensor carrier material is virtually rigid in one or two directions other than the at least one direction that deforms above a defined minimum force, and only breaks or collapses virtually without resistance under forces that are a multiple of the defined minimum force.

Preferably, the sensor carrier is completely composed of an inherently rigid cellular material, wherein strengths of volume elements of a sensor section and at least one component section are direction-independent and greater than a strength of volume elements of the at least one intermediate section in a direction of easier deformability of the at least one intermediate section, in order to permit trouble-free connections of the sensor carrier to the sensor and/or the motor vehicle component, e.g. via screws and appropriate screw holes in the sensor carrier.

Preferably, the sensor carrier is produced in one piece by 3-D printing. 3-D printing is particularly suitable to implement direction-independent and direction-dependent deformabilities in some sections in a single component for the sensor carrier, e.g. with sandwich and/or lattice structures in the at least one intermediate section, and is also economical in small series. Here, 3-D printing refers to all types of additive production, i.e. to generative production methods, and is not limited to 3-D printing techniques in any narrower sense.

In one embodiment, the sensor carrier has a shape of an elongated bow. A central section of the elongated bow forms the sensor section and ends of the elongated bow each form one of the component sections, wherein a central section and the ends are in each case connected to each other by the intermediate section.

In a further embodiment, the sensor carrier has a shape of an angle. A first end section of the angle forms the sensor section and a second end section of the angle forms one of the component sections, wherein the second end section has an angular offset with respect to the first end section, and the first end section and the second end section are connected to each other by the intermediate section.

The material of the sensor carrier in the at least one intermediate section is preferably more deformable in a direction that corresponds to a measuring direction of a sensor fitted to the sensor carrier than in other directions.

There follows a description of exemplary embodiments with reference to the drawings, in which:

BRIEF DESCRIPTION OF THE DRAWINGS

FIG. 1 shows a cross sectional view through a cruise-control sensor, which is fixed to a radiator or a radiator shutter by a sensor carrier; and FIG. 2 shows partial cross-sections through some possible partial material structures in the sensor carrier from FIG. 1.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

FIG. 1 shows a cruise-control sensor 1, which is fixed via a sensor carrier 2 between a radiator 3, for example, and a radiator grille (not shown) of a motor vehicle. Alternatively, the element designated by 3 can be a radiator shutter arranged directly in front of the radiator, or another component of the motor vehicle.

The sensor carrier 2 is a one-piece part in the form of an elongated curved bow. A central section 4 of the elongated curved bow forms a sensor section 4 that the sensor 1 is screwed, and two arms of the elongated curved bow are each subdivided into an intermediate section 5, 6 and a distal component section 7, 8, wherein the component sections 7, 8 are each screwed to the radiator 3. One of the screws that screws the sensor 1 to the sensor carrier 2 is a position-adjusting screw that adjusts a detection region 9, pointing in a direction of travel, of the sensor 1.

The sensor carrier 2 is composed of an inherently rigid cellular material. A strength or compliance or deformability of the sensor carrier 2 is different in different sections and is direction-independent or direction-dependent in sections.

In particular, the component section 7, 8 of the sensor carrier 2 in regions 11 of the screw-fixing to the radiator 3, indicated by oval circles 11, is relatively solid and is not deformable or deformable only with great difficulty. In adjacent regions 12 of the component sections 7, 8, indicated by symbols 12, and in a region of the sensor section 4, the sensor carrier 2 is somewhat less solid but stable enough to transfer holding forces between sensor 1, sensor carrier 2 and radiator 3.

The sensor carrier 2 is most compliant and most deformable in the intermediate sections 5, 6, where no circles 11 or symbols 12, but rather only hatching, is shown in FIG. 1. In the intermediate sections 5, 6, deformability of the sensor carrier 2 is additionally direction-dependent or at least more direction-dependent than in the sensor and component sections 4, 7 and 8. For the application described here and comparable applications, the sensor carrier 2 is more deformable in a direction of travel than transversely thereto.

The comparatively high strength of the sensor and component sections 4, 7 and 8 can be achieved by higher wall thicknesses of cells of the material in the sensor and component sections 4, 7 and 8 or else by partial solidity.

The sensor carrier 2 can be produced using 3-D printing from a material suitable for the purpose, such as, for example, plastic, metal or ceramic, wherein direction-dependent deformability of the intermediate sections 5, 6 is achieved by suitable cellular structures.

Examples of structures with direction-dependent deformability are shown in FIG. 2 in a), b) and c). If such structures are layered on one another, the result is sandwich and/or lattice structures, e.g. of ribbed or corrugated layers having very high inherent strength in relation to inherent weight. Other regular structures, such as honeycomb structures, for example, can also be considered. Furthermore, what are known as bionic structures can be considered. Bionic structures are models in nature, such as for example, a mushroom-shape and also do not have to be as regular as constructionally produced structures are normally. The material structure can be closed-pored or open-pored.

CAE analyses make it possible to define exactly where, in the material matrix, cell walls will collapse first in an event of an impact and how forces from an impact will propagate to reach total deformation of the sensor carrier 2. Thus, energy necessary to deform the sensor carrier 2 can also be defined exactly. Furthermore, the sensor carrier 2 is configured in such a way that, in an event of an impact, the sensor carrier 2 normally does not break, but remains in one piece.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle sensor carrier, comprising:
   a sensor section that fixes a sensor;
   a component section that fixes an adjacent region to a component; and
   an intermediate section that connects the sensor section to the component section, wherein the intermediate section is formed from a cellular material having cavities arranged such that, in response to a defined minimum force, the intermediate section is deformed greater in one direction than other directions.

2. The sensor carrier as claimed in claim 1, wherein the intermediate section deforms only at the defined minimum force, inelastically, to change a cellular structure of the intermediate section.

3. The sensor carrier as claimed in claim 1, wherein the intermediate section includes volume elements that are of equal size in all three spatial directions and inelastically deformable in at least one direction with less than half a force expenditure compared with at least one other direction.

4. The sensor carrier as claimed in claim 3, wherein the sensor section and the component section include volume elements having a strength that is direction-independent and greater than a strength of the volume elements of the intermediate section in a direction of deformability of the intermediate section.

5. The sensor carrier as claimed in claim 1, wherein the sensor section, the component section and the intermediate section are produced in one piece via additive manufacturing to 3-D print the sensor, component and intermediate sections.

6. The sensor carrier as claimed in claim 1, wherein the intermediate section sandwiches a lattice structure.

7. The sensor carrier as claimed in claim 1 further comprising a central section that forms the sensor section having ends that each form the component section, wherein the central section and the ends are interconnected by the intermediate section to form an elongated-bow shape.

8. The sensor carrier as claimed in claim 1, wherein the sensor section includes a first end section and the component section includes a second end section, the first and second end sections being interconnected via the intermediate section such that the second end section has an angular offset with respect to the first end section.

9. The sensor carrier as claimed in claim 1, wherein the intermediate section deforms greater in a direction that corresponds to a measuring direction of a sensor fitted to the sensor carrier than in other directions.

10. A vehicle comprising:
a sensor carrier that mechanically connects a sensor to a component, and has an intermediate section that is formed from a cellular material having cavities arranged such that, in response to a defined minimum force, the intermediate section deforms greater in one direction than other directions, wherein the sensor carrier is unitarily formed via additive manufacturing in an elongated-bow shape.

11. The vehicle as claimed in claim 10, wherein the component is a radiator.

12. The vehicle as claimed in claim 10, wherein the component is a radiator shutter arranged in front of a radiator.

13. The vehicle as claimed in claim 10, wherein the intermediate section includes volume elements that are of equal size in all three spatial directions and inelastically deformable in at least one direction with less than half a force expenditure compared with at least one other direction.

14. The vehicle as claimed in claim 13, wherein the intermediate section interconnects a sensor section and a component section that each include volume elements having a strength that is direction-independent and greater than a strength of the volume elements of the intermediate section in a direction of deformability of the intermediate section.

15. The vehicle as claimed in claim 10, wherein the intermediate section has a cross-section indicative of a bionic-structure shape.

16. A vehicle front end comprising:
a carrier interconnecting a sensor and radiator shutters, the carrier defining an elongated-bow shape having an intermediate section that is formed from a cellular material having cavities arranged such that, in response to a defined minimum force, the intermediate section deforms greater in one direction than other directions, wherein the sensor carrier is formed via additive manufacturing such that a cross-section of the intermediate section has a bionic-structure shape.

17. The vehicle front end as claimed in claim 16, wherein the intermediate section includes volume elements that are of equal size in all three spatial directions and inelastically deformable in at least one direction with less than half a force expenditure compared with at least one other direction.

18. The vehicle front end as claimed in claim 17, wherein the intermediate section interconnects a sensor section and a component section that each include volume elements having a strength that is direction-independent and greater than a strength of the volume elements of the intermediate section in a direction of deformability of the intermediate section.

19. The vehicle front end as claimed in claim 16, wherein the intermediate section deforms greater in a direction that corresponds to a measuring direction of the sensor than in other directions.

20. The vehicle front end as claimed in claim 16, wherein the intermediate section inelastically deforms only at the defined minimum force to change a cellular structure of the intermediate section.

* * * * *